United States Patent
Park et al.

(10) Patent No.: US 11,978,852 B2
(45) Date of Patent: May 7, 2024

(54) LITHIUM ELECTRODE AND LITHIUM SECONDARY BATTERY COMPRISING SAME

(71) Applicant: LG CHEM, LTD., Seoul (KR)

(72) Inventors: Eunkyung Park, Daejeon (KR); Minchul Jang, Daejeon (KR); Bora Jung, Daejeon (KR); Suk Il Youn, Daejeon (KR); Byoungkuk Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 449 days.

(21) Appl. No.: 16/975,333

(22) PCT Filed: Oct. 31, 2019

(86) PCT No.: PCT/KR2019/014641
§ 371 (c)(1),
(2) Date: Aug. 24, 2020

(87) PCT Pub. No.: WO2020/091479
PCT Pub. Date: May 7, 2020

(65) Prior Publication Data
US 2020/0411907 A1    Dec. 31, 2020

(30) Foreign Application Priority Data
Oct. 31, 2018  (KR) .................. 10-2018-0131652
Oct. 31, 2019  (KR) .................. 10-2019-0137931

(51) Int. Cl.
*H01M 10/0565*   (2010.01)
*H01M 4/62*      (2006.01)
*H01M 10/0525*   (2010.01)

(52) U.S. Cl.
CPC ....... *H01M 10/0565* (2013.01); *H01M 4/626* (2013.01); *H01M 10/0525* (2013.01);
(Continued)

(58) Field of Classification Search
CPC ............. H01M 10/0565; H01M 4/626; H01M 10/0525; H01M 2220/20; H01M 2300/0022; H01M 2300/0082
See application file for complete search history.

(56) References Cited

U.S. PATENT DOCUMENTS

| 6,576,371 B1 | 6/2003 | Yasuda et al. |
| 9,680,181 B2 | 6/2017 | Rhee et al. |

(Continued)

FOREIGN PATENT DOCUMENTS

| CN | 1511351 A | 7/2004 |
| CN | 1675792 A | 9/2005 |

(Continued)

OTHER PUBLICATIONS

European Patent Office Search Report dated May 14, 2021 for family Application No. EP 19877644.5.
(Continued)

*Primary Examiner* — Matthew T Martin
*Assistant Examiner* — Taylor Harrison Krone
(74) *Attorney, Agent, or Firm* — Birch, Stewart, Kolasch & Birch, LLP

(57) ABSTRACT

A lithium electrode and a lithium secondary battery including the same, which includes a first protective layer and a second protective layer sequentially formed on at least one surface of lithium metal layer. The second protective layer contains a cross-linked ion conductive electrolyte in the interior and on the surface of the electrically conductive matrix, and thus the first protective layer has higher ion conductivity than the second protective layer, thereby pre- (Continued)

venting electrons from being concentrated into lithium dendrites formed from the lithium metal to inhibit the growth of lithium dendrites, and at the same time, physically inhibiting the growth of lithium dendrites by the second protective layer.

7 Claims, 1 Drawing Sheet

(52) U.S. Cl.
CPC .................. *H01M 2220/20* (2013.01); *H01M 2300/0022* (2013.01); *H01M 2300/0082* (2013.01)

(56) References Cited

U.S. PATENT DOCUMENTS

| | | | |
|---|---|---|---|
| 2002/0012846 A1* | 1/2002 | Skotheim | H01M 50/46 429/231.95 |
| 2004/0209159 A1 | 10/2004 | Lee et al. | |
| 2005/0095504 A1 | 5/2005 | Kim et al. | |
| 2006/0102869 A1 | 5/2006 | Cavaille et al. | |
| 2007/0221265 A1 | 9/2007 | Affinito et al. | |
| 2009/0162754 A1 | 6/2009 | Cotton et al. | |
| 2009/0317724 A1 | 12/2009 | Kumar et al. | |
| 2012/0094189 A1 | 4/2012 | Scrosati et al. | |
| 2013/0095380 A1 | 4/2013 | Affinito et al. | |
| 2013/0260257 A1 | 10/2013 | Cho! | |
| 2014/0011101 A1 | 1/2014 | Ma et al. | |
| 2017/0294671 A1 | 10/2017 | Jin et al. | |
| 2018/0051137 A1 | 2/2018 | Kim et al. | |
| 2018/0053978 A1 | 2/2018 | Song et al. | |
| 2018/0166743 A1* | 6/2018 | Lee | H01M 50/417 |
| 2018/0301707 A1* | 10/2018 | Pan | H01M 4/628 |
| 2019/0058185 A1 | 2/2019 | Lee et al. | |
| 2019/0393482 A1* | 12/2019 | He | H01M 4/0402 |
| 2020/0127293 A1* | 4/2020 | Son | H01M 4/134 |

FOREIGN PATENT DOCUMENTS

| | | |
|---|---|---|
| CN | 101438453 A | 5/2009 |
| CN | 108232289 A | 6/2018 |
| EP | 1407505 A2 | 4/2004 |
| EP | 3 509 138 A2 | 7/2019 |
| EP | 3 675 244 A1 | 1/2020 |
| JP | 5-298915 A | 11/1993 |
| JP | 2004-206942 A | 7/2004 |
| JP | 3640863 B2 | 5/2005 |
| JP | 5241060 B2 | 7/2013 |
| JP | 5588128 B2 | 9/2014 |
| JP | 2016-15250 A | 1/2016 |
| JP | WO 2017-21971 A | 1/2017 |
| KR | 10-0125151 B1 | 7/1996 |
| KR | 10-2002-0085942 A | 11/2002 |
| KR | 10-0368438 B1 | 1/2003 |
| KR | 10-2004-0090561 A | 10/2004 |
| KR | 10-0485336 B1 | 4/2005 |
| KR | 10-0542213 B1 | 1/2006 |
| KR | 10-0658546 B1 | 12/2006 |
| KR | 10-2010-0098548 A | 9/2010 |
| KR | 10-2012-0000708 A | 1/2012 |
| KR | 10-1107731 B1 | 1/2012 |
| KR | 10-2012-0092918 A | 8/2012 |
| KR | 10-2013-0042513 A | 4/2013 |
| KR | 10-2013-0111833 A | 10/2013 |
| KR | 10-2014-0006639 A | 1/2014 |
| KR | 10-2014-0083024 A | 7/2014 |
| KR | 10-2014-0110373 A | 9/2014 |
| KR | 10-2014-0112597 A | 9/2014 |
| KR | 10-2014-0120269 A | 10/2014 |
| KR | 10-2014-0125970 A | 10/2014 |
| KR | 10-2015-0101235 A | 9/2015 |
| KR | 10-2015-0129534 A | 11/2015 |
| KR | 10-2016-0051196 A | 5/2016 |
| KR | 10-2016-0052323 A | 5/2016 |
| KR | 10-2016-0136247 A | 11/2016 |
| KR | 10-2016-0136248 A | 11/2016 |
| KR | 10-2017-0099375 A | 8/2017 |
| KR | 10-2017-0123727 A | 11/2017 |
| KR | 10-2018-0019822 A | 2/2018 |
| KR | 10-2018-0020599 A | 2/2018 |
| KR | 10-2018-0032168 A | 3/2018 |
| KR | 10-2018-0036564 A | 4/2018 |
| KR | 10-1850901 B1 | 4/2018 |
| KR | 10-1865834 B1 | 6/2018 |
| KR | 10-2018-0076709 A | 7/2018 |
| KR | 10-2018-0092180 A | 8/2018 |
| WO | WO 01/97304 A1 | 12/2001 |
| WO | WO 02/095849 A2 | 11/2002 |
| WO | WO 2007/111901 A2 | 10/2007 |
| WO | WO 2013/137224 A1 | 9/2013 |
| WO | WO 2017/104867 A1 | 6/2017 |

OTHER PUBLICATIONS

International Search Report (PCT/ISA/210) issued in PCT/KR2019/014641, dated Feb. 11, 2020,.
Ohta et al., "LiNbO3-coated LiCoO2 as cathode material for all solid-state lithium secondary batteries," Electrochemistry Communications, vol. 9, 2007, pp. 1486-1490.
Qian et al., "High rate and stable cycling of lithium metal anode," Nature communications, vol. 6, 2015, pp. 1-9.
Tominaga et al., "Fast Li-ion conduction in poly(ethylene carbonate)-based electrolytes and composites filled with TiO2 nanoparticles," Chem. Commun., vol. 50, 2014, pp. 4448-4450.
Zhang et al., "Lithium bis(fluorosulfonyl)imide/poly(ethylene oxide) polymer electrolyte," Electrochimica Acta, vol. 133, 2014, pp. 529-538.

* cited by examiner

[Figure 1]
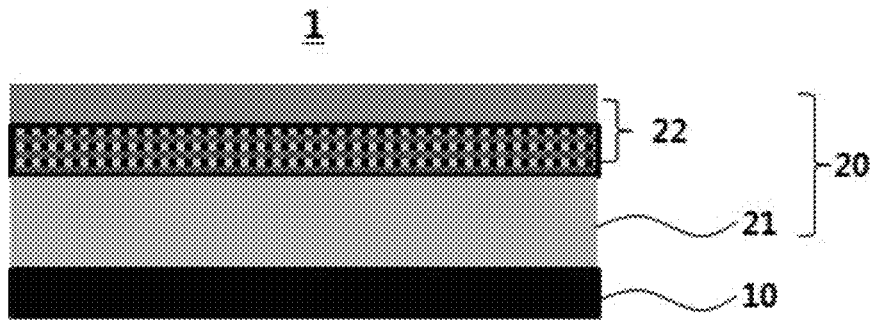
[Figure 2]
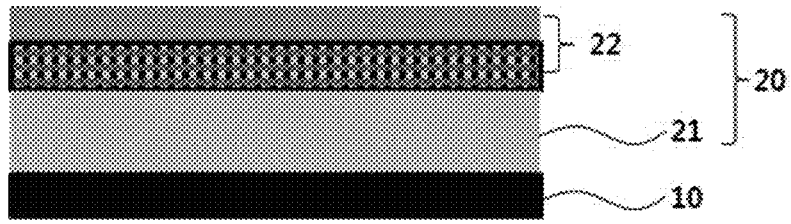
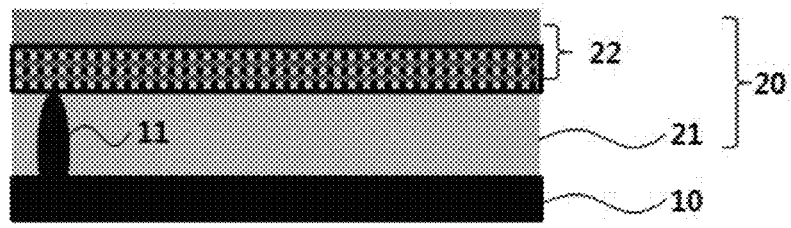
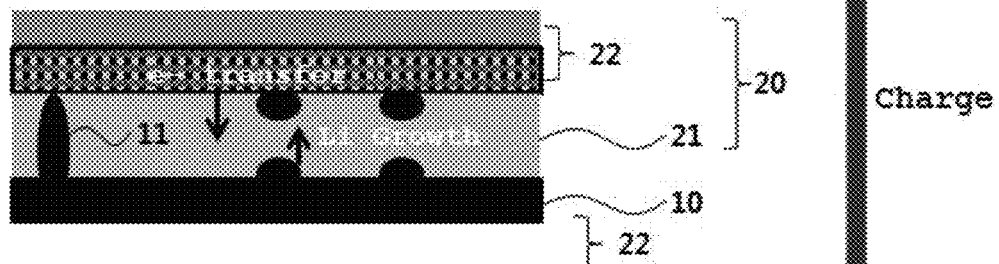
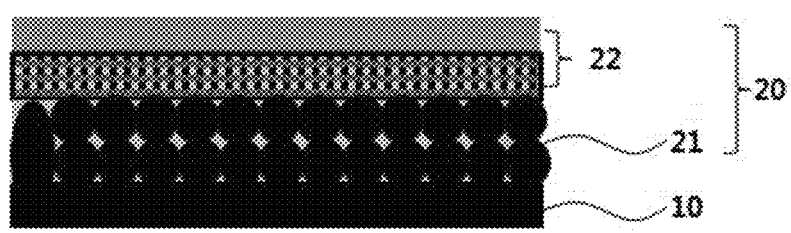

LITHIUM ELECTRODE AND LITHIUM SECONDARY BATTERY COMPRISING SAME

TECHNICAL FIELD

This application claims the benefits of priorities based on Korean Patent Application No. 10-2018-0131652 filed on Oct. 31, 2018 and Korean Patent Application No. 10-2019-0137931 filed on Oct. 31, 2019, the entire contents of which are incorporated herein by reference.

The present invention relates to a lithium electrode having a protective layer capable of preventing the growth of lithium dendrites and a lithium secondary battery comprising the same.

BACKGROUND ART

Until a recent date, there has been considerable interest in developing batteries with high energy densities using lithium as a negative electrode. For example, as compared to other electrochemical systems with a lithium-inserted carbon negative electrode that reduces the energy density of the battery by increasing the weight and volume of the negative electrode due to the presence of the non-electroactive material, and a nickel or cadmium electrode, since lithium metal has low weight and high capacity characteristics, lithium metal has attracted much attention as a negative electrode active material for electrochemical batteries. Lithium metal negative electrode, or negative electrodes, which mainly comprise lithium metal, provides the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Conventional lithium ion batteries have an energy density of about 700 wh/l by using graphite as a negative electrode and using lithium cobalt oxide (LCO) as a positive electrode. However, in recent years, the fields requiring high energy density are expanding, and thus there is a continuing need to increase the energy density of a lithium ion battery. For example, even in order to increase the mileage of an electric car by a single charge to 500 km or more, an increase in energy density is required.

The use of lithium electrodes is increasing to increase the energy density of lithium ion batteries. However, there is a problem that lithium metal is difficult to handle in process because it is highly reactive and difficult to handle.

If lithium metal is used as a negative electrode of a lithium secondary battery, the lithium metal reacts with impurities such as electrolytes and water or organic solvents, lithium salts and the like to form a passivation layer (Solid Electrolyte Interphase: SEI). Such a passivation layer causes localized current density differences to promote the formation of dendritic dendrite by lithium metal during charging, and the dendrite grows gradually during charging/discharging, thereby causing an internal short circuit between the positive electrode and the negative electrode. Also, the dendrites have a mechanically weak part (bottle neck), and thus forms inert lithium (dead lithium) which loses electrical contact with the current collector during discharging, thereby reducing the capacity of the battery, shortening the cycle lifetime, and adversely affecting the stability of the battery.

In order to improve the problems of the lithium metal negative electrode as described above, lithium metal negative electrodes with protective layers having various compositions or forms have been developed.

Korean Patent Publication No. 2018-0032168 relates to a negative electrode comprising a multiple protective layer, which can solve the problem of volume expansion of the cell due to lithium dendrites by forming the multiple protective layer comprising a protective layer for protecting the lithium metal layer and maintaining an interface with the lithium metal layer, a protective layer for physically inhibiting the growth of dendrites, and a protective layer for supporting the structure of the protective layer.

As described above, until now, researches on the development of a protective layer to prevent the growth of the dendrite of lithium metal in a battery using lithium metal negative electrode have been made. However, in the lithium metal negative electrode, since the problem of degradation of battery performance due to the growth of lithium dendrites is still recognized as a problem to be solved, there is an urgent need to develop a lithium metal negative electrode having a protective layer capable of protecting lithium metal in more various forms.

PRIOR ART DOCUMENTS (Patent Document 1) Korean Patent Publication No. 2018-0032168
(Patent Document 2) Korean Patent Publication No. 2018-0036564

DISCLOSURE

Technical Problem

As a result of various studies to solve the above problems, the inventors of the present invention have formed a protective layer on the lithium electrode, but formed a multiple protective layer comprising a first protective layer having excellent ion conductivity and a second protective layer having excellent electrical conductivity and physical strength sequentially from the surface of the lithium metal on the lithium electrode. Such a multiple protective layer can inhibit the growth of lithium dendrites in the lithium electrode and minimize the growth of lithium dendrites even if defects occur.

Therefore, one embodiment of the present invention is to provide a lithium electrode having a multiple protective layer formed thereon.

In addition, Another embodiment of of the present invention is to provide a lithium secondary battery including the lithium electrode having the multiple protective layer formed thereon as described above.

Technical Solution

In order to achieve the above objects, the present invention provides a lithium electrode comprising lithium metal layer; and a protective layer formed on at least one surface of the lithium metal layer, wherein the protective layer comprises a first protective layer formed on the at least one surface of the lithium metal layer; and a second protective layer formed on the first protective layer opposite to the lithium metal layer, the first protective layer comprises an ion conductive electrolyte, and the second protective layer comprises an electrically conductive matrix and a cross-linked ion conductive electrolyte.

The present invention also provides a lithium secondary battery comprising the lithium electrode comprising the protective layer as described above.

Advantageous Effects

According to one embodiment the present invention, the lithium electrode includes a multiple protective layer including a first protective layer and a second protective layer sequentially formed on the surface of the lithium metal, and the first protective layer in contact with the lithium metal may prevent the volume change of the lithium metal during charging/discharging.

In addition, since the second protective layer has a form in which a cross-linked ion conductive electrolyte is formed in the interior and on the surface of the electrically conductive matrix, the first protective layer may have higher ion conductivity than the second protective layer, thereby preventing electrons from being concentrated to lithium dendrites formed from the lithium metal, and thus inhibiting the growth of the lithium dendrites.

In addition, the second protective layer is formed on the first protective layer, and is electrically connected with lithium metal as charging/discharging proceeds, so that the lithium dendrites may be contained only inside the first protective layer, thereby preventing the lithium dendrites from growing out of the lithium electrode.

In addition, the second protective layer may further enhance the effect of inhibiting the growth of lithium dendrites by mechanically inhibiting the growth of lithium dendrites due to its excellent strength.

DESCRIPTION OF DRAWINGS

FIG. 1 is a schematic diagram of the lithium electrode according to an embodiment of the present invention.

FIG. 2 is a schematic diagram showing the principle of preventing the growth of lithium dendrites in the lithium electrode according to an embodiment of the present invention.

BEST MODE

Hereinafter, the present invention will be described in more detail in order to help understanding of the present invention.

The terms and words used in the present specification and claims should not be construed as limited to ordinary or dictionary terms, and should be construed in a sense and concept consistent with the technical idea of the present invention, based on the principle that the inventor may properly define the concept of a term to describe his invention in the best way possible.

Lithium Electrode

One embodiment of the present invention provides a lithium electrode comprising lithium metal; and a multiple protective layer formed on the lithium metal, wherein the multiple protective layer comprises a first protective layer and a second protective layer sequentially formed on at least one surface of the lithium metal. The second protective layer 22 may appear to have two layers, but as will be described later, a cross-linked ion conductive electrolyte is formed inside the electrically conductive matrix, and the ion conductive electrolyte is also formed on the surface and thus it only appears to be two layers. In the drawing, reference numeral 22 denotes one layer designated as a second protective layer.

Hereinafter, the present invention will be described in more detail with reference to the drawings.

FIG. 1 is a schematic diagram of the lithium electrode according to an embodiment of the present invention.

Referring to FIG. 1, the lithium electrode 1 according to the present invention comprises lithium metal 10, the first protective layer 21 formed on one surface of the lithium metal 10, and the second protective layer 22 formed on the first protective layer 21. In this case, the sum of the first protective layer 21 and the second protective layer 22 is referred to as the multiple protective layer 20.

FIG. 2 is a schematic diagram showing the principle of preventing the growth of lithium dendrites in the lithium electrode according to an embodiment of the present invention.

Referring to FIG. 2, as charging/discharging is proceeded, the lithium dendrites 11 are formed on one surface of the lithium metal 10 to be in electrical contact with the second protective layer 22. At this time, since electrons (e$^-$) of the second protective layer 22 with excellent electrical conductivity is fully and evenly transferred. And the ion conductivity of the first protective layer 21 is higher than that of the second protective layer 22, reduction occurs in the first protective layer 21 which is rich in lithium ions (Li$^+$), and thus the lithium dendrites 11 are formed only inside the first protective layer 21, and the growth of lithium dendrites out of the lithium electrode 1 can be prevented.

In the present invention, the first protective layer is formed on at least one surface of the lithium metal, and may prevent the phenomenon that lithium ion is depleted on the surface of the lithium metal.

The first protective layer may comprise an ion conductive electrolyte, and the ion conductive electrolyte may comprise an ion conductive polymer.

The ion conductive polymer may be at least one selected from the group consisting of poly(ethylene oxide (PEO), poly(polypropylene oxide (PPO), poly(acrylonitrile) (PAN), and poly(vinylidene fluoride) (PVDF).

In addition, the ion conductive electrolyte may be a liquid, gel, or solid phase, preferably a solid phase. If the ion conductive electrolyte is in a solid phase, the ion conductive electrolyte may include the ion conductive polymer and lithium salt, and may further include an additive as necessary. The lithium salt and the additive are as described below in the description related to the second protective layer.

The weight ratio of the monomer forming the ion conductive polymer and lithium may be 10 to 30:1, preferably 15 to 25:1. If the weight ratio is satisfied, the ion conductivity and the inhibitory effect of lithium dendrites may be the best. For example, the weight ratio of ethyl oxide forming the ion conductive polymer and lithium may be 10 to 30:1.

The ion conductivity of the first protective layer may be $10^{-5}$ to $10^{-2}$ S/cm, preferably $10^{-4}$ to $10^{-3}$ S/cm. If the ion conductivity of the first protective layer is less than the above range, the lithium ion may be depleted on the surface of the lithium metal, thereby degrading battery performance. If the ion conductivity of the first protective layer exceeds the above range, even when the ion conductivity is increased, the battery performance is not further improved.

In the present invention, the second protective layer is formed on the first protective layer, and allows electrons to be transferred to the surface of lithium metal where lithium ion is relatively higher than second protective layer, thereby preventing electrons from being concentrated to lithium dendrites generated from the first protective layer, and thus inhibiting the growth of the lithium dendrites.

The second protective layer may include an electrically conductive matrix and a cross-linked ion conductive electrolyte. The electrically conductive matrix may be in the form of a three-dimensional structure in which internal spaces are formed. The internal spaces may be referred to as pores.

The ion conductive electrolyte may be filled in the internal spaces of the electrically conductive matrix, and also the electrically conductive matrix may be surrounded by the cross-linked ion conductive electrolyte, that is, the cross-lined ion conductive electrolyte may be formed on the surface of the electrically conductive matrix.

Due to this form of the second protective layer, it is possible to make the physical strength uniform on the surface of the lithium electrode, thereby inhibiting the growth of lithium dendrites.

In addition, due to the strength of the second protective layer itself, it is possible to suppress the growth of lithium dendrites, thereby preventing the generation of lithium disconnected from electrical contact (dead Li).

In addition, in the second protective layer, a weight ratio of the ion conductive polymer contained in the electrically conductive matrix and the cross-linked ion conductive electrolyte may be 3:7 to 7:3. If the amount of the electrically conductive matrix is more than the appropriate weight while being outside the prescribed weight range as described above, since the content of the ion conductive polymer is relatively reduced, the Li ion conductivity of the protective layer is so low that more Li is grown on the protective layer, making it difficult to inhibit the growth of the Li dendrites. On the contrary, if the amount of the electrically conductive matrix is less than the appropriate weight while being outside the prescribed weight range as described above, the vertical/horizontal physical strength may be degraded, making it difficult to transfer uniform electrons to the surface of the electrode.

The cross-linked ion conductive electrolyte may be in a solid phase, and the ion conductive electrolyte may contain 25 to 50% by weight of the remaining components excluding the solvent in the electrolyte solution together with the ion conductive polymer. In other words, the content of the remaining components excluding the solvent in the electrolyte solution may be 25 to 50% by weight relative to 100% by weight of the ion conductive polymer. At this time, the remaining components except for the solvent in the electrolyte solution may be a lithium salt and an additive.

The weight ratio of the monomer forming the ion conductive polymer and lithium may be 10 to 30:1, preferably 15 to 25:1. If the weight ratio is satisfied, the electrical conductivity and the inhibitory effect of lithium dendrites may be the best. For example, the weight ratio of ethyl oxide forming the ion conductive polymer and lithium may be 10 to 30:1.

In addition, the cross-linked ion conductive electrolyte may comprise a cross-linking agent. The cross-linking agent may be at least one selected from the group consisting of poly(ethylene glycol) diacrylate (PEGDA), poly(ethylene glycol) dimethacrylate (PEGDMA), poly(propylene glycol) diacrylate (PPGDA), and poly(propylene glycol) dimethacrylate (PPGDMA).

The weight ratio of the ion conductive polymer and the cross-linking agent may be 70 to 90:10 to 30. If the weight ratio range is satisfied, due to the excellent modulus, a cross-linked ion conductive electrolyte layer may be formed that is effective in inhibiting the growth of lithium dendrites.

In the second protective layer, the ion conductive electrolyte has a cross-linked form as described above, so that the ion conductivity is lower than that of the first protective layer including the uncross-linked ion conductive electrolyte.

In the present invention, the sheet resistance of the second protective layer may be $5\times10^{-2}$ Ω/sq. to 1000 Ω/sq., preferably $1\times10^{-2}$ Ω/sq. to 500 Ω/sq., more preferably $1\times10^{-2}$ Ω/sq. to 300 Ω/sq. If the sheet resistance is less than the above range, it is difficult to suppress the growth of Li dendrites because more Li grows on the protective layer. If the sheet resistance exceeds the above range, the protective layer may act as a large resistance layer, thereby deteriorating the lifetime characteristic of the battery.

In the present invention, the ion conductivity of the second protective layer may be $1\times10^{-6}$ S/cm to $1\times10^{-2}$ S/cm, preferably $1\times10^{-5}$ S/cm to $1\times10^{-2}$ S/cm, more preferably $1\times10^{-4}$ S/cm to $1\times10^{-2}$ S/cm. If the ion conductivity is less than the above range, the ion conductivity is not good, so that more Li grows on the protective layer, making it difficult to inhibit the growth of Li dendrites. A protective layer whose ion conductivity exceeds this range may not be formed. The ion conductivity of the second protective layer may also mean vertical lithium ion conductivity.

Within the range of the ion conductivity of the first protective layer and the range of the ion conductivity of the second protective layer, the ion conductivity of the first protective layer is higher than the ion conductivity of the second protective layer.

In the present invention, since the electrically conductive material contained in the electrically conductive matrix is uniformly distributed while forming a three-dimensional structure throughout the electrically conductive matrix, the protective layer may be able to exhibit a uniform electrical conductivity.

The electrically conductive material may be at least one selected from the group consisting of an electrically conductive metal, a semiconductor, and an electrically conductive polymer. The electrically conductive metal may be at least one selected from the group consisting of copper, gold, silver, aluminum, nickel, zinc, carbon, tin, and indium. The semiconductor may be at least one selected from the group consisting of silicon and germanium. The electrically conductive polymer may be at least one selected from the group consisting of poly(3,4-ethylenedioxythiophene) (PEDOT), polyaniline, polypyrrole, polythiophene, polyacetylene, polyphenylene, and poly(thienylene vinylene).

In the present invention, the ion conductive electrolyte contained in the electrically conductive matrix may comprise an ion conductive polymer.

The ion conductive polymer may be at least one selected from the group consisting of poly(ethylene oxide) (PEO), poly(polypropylene oxide) (PPO), poly(acrylonitrile) (PAN) and poly(vinylidene fluoride) (PVDF).

In addition, the ion conductive electrolyte may be a liquid, gel, or solid phase. The form of the ion conductive electrolyte may be determined depending on the characteristics of the ion conductive polymer.

The liquid phase or gel phase electrolyte solution contained in the liquid phase or gel phase ion conductive electrolyte may further include a lithium salt, a non-aqueous solvent, and additionally an additive. The solid ion conductive electrolyte may further contain a lithium salt and additionally an additive.

The lithium salt may be at least one selected from the group consisting of LiCl, LiBr, LiI, $LiNO_3$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, lithium chloroborane, lithium lower aliphatic carboxylate, lithium tetraphenyl borate, and lithium imide.

In addition, as a non-aqueous solvent contained in the ion conductive electrolyte, those conventionally used in the electrolyte solution for the lithium secondary battery may be used without limitation, and for example, ethers, esters, amides, linear carbonates, cyclic carbonates and the like may be used alone, respectively, or in mixtures of two or more thereof. Among them, a carbonate compound which is typically a cyclic carbonate, a linear carbonate, or a slurry thereof may be contained.

Specific examples of the cyclic carbonate compound may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides comprise, but are not limited to, fluoroethylene carbonate (FEC) and the like.

In addition, specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate, or a slurry of two or more thereof. In particular, ethylene carbonate and propylene carbonate, which are cyclic carbonates among the carbonate-based organic solvent, are highly viscous organic solvents having a high dielectric constant, so that the lithium salt in the electrolyte may be more easily dissociated. If such cyclic carbonates are mixed with linear carbonates having a low viscosity and a low dielectric constant, such as dimethyl carbonate and diethyl carbonate, in an appropriate ratio, an electrolyte solution having a higher electrical conductivity may be prepared.

In addition, the ether among the non-aqueous solvents may be, but is not limited to, at least one selected from the group consisting of dimethyl ether, diethyl ether, dipropyl ether, methylethyl ether, methylpropyl ether, and ethylpropyl ether, or two or more thereof.

In addition, the ester among the non-aqueous solvents may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or two or more thereof.

In addition, the additive contained in the ion conductive electrolyte may be at least one selected from the group consisting of fluoroethylene carbonate (FEC), 1,3-propanesultone (1,3-PS), and vinyl ethylene carbonate (VEC), preferably, fluoroethylene carbonate (FEC).

The content of the additive may be 2 to 13% by weight, preferably 3 to 10% by weight, more preferably 4 to 8% by weight, based on the total weight of the electrolyte solution. If the content of the additive is within the above range, the lifetime characteristics of the lithium secondary battery may be improved, and the thickness expansion ratio of the lithium secondary battery may be reduced.

Method of Manufacturing Lithium Electrode

The present invention relates to a method for preparing a lithium electrode comprising the steps of (A) forming a first protective layer on lithium metal; (B) forming a second protective layer on a release film; and (C) transferring the second protective layer onto the first protective layer.

Hereinafter, the present invention will be described in more detail with respect to each step.

In step (A), a first protective layer may be formed on the lithium metal.

The first protective layer comprises an ion conductive electrolyte as described above, and the ion conductive electrolyte comprises an ion conductive polymer.

The first protective layer may be formed by dissolving the ion conductive polymer in the electrolyte solution to form a mixed solution, applying the mixed solution onto the release film to form an ion conductive electrolyte layer, and subsequently, transferring the ion conductive electrolyte layer to lithium metal. Alternatively, the first protective layer may be formed by dissolving the ion conductive polymer in the electrolyte solution to make a mixed solution and applying the mixed solution onto the lithium electrode. At this time, the concentration of the mixed solution may be 15 to 35% by weight based on the weight of the solid content, and as a result, the process of forming the first protective layer may be made smoothly, and the defective rate of the manufactured first protective layer may be reduced.

The material and thickness of the release film is not particularly limited, and various films may be used. As the release film, for example, a polyethylene terephthalate (PET) film, a polyethylene (PE) film, a polypropylene (PP) film, a silicon-based release film and the like may be used, and the thickness of the release film may be, for example, 12 μm to 80 μm.

The coating method may be solution casting, spray casting, spraying, or rolling, but is not limited thereto.

In addition, the first protective layer may be in the form of a layer or a film, and the initiator may be used together to form such the form well. The initiator may be used together to form the cross-linked ion conductive electrolyte layer. The initiator may be at least one selected from the group consisting of azobisisobutyronitrile, benzoyl peroxide, t-butylperoxy-2-ethyl-hexanoate, cumylperoxide, t-butylperoxide and 1,1-di(t-butylperoxy)cyclohexane.

In step (B), a second protective layer may be formed on the release film.

The second protective layer comprises an electrically conductive matrix and a cross-linked ion conductive electrolyte.

The method for preparing the second protective layer may comprise the steps of (b1) applying a mixture of the ion conductive polymer, the cross-linking agent, and the lithium salt to the release film to form a crosslinked ion conductive electrolyte layer; and (b2) depositing the electrically conductive material on the cross-linked ion conductive electrolyte layer to form a second protective layer comprising the electrically conductive matrix and the cross-linked ion conductive electrolyte.

In step (b1), the ion conductive polymer and the cross-linking agent may be dissolved in an electrolyte solution to form a mixed solution, and then the mixed solution may be applied onto the release film to form a cross-linked ion conductive electrolyte layer. At this time, the concentration of the mixed solution may be 15 to 35% by weight based on the weight of the solid content, and as a result, the process of forming the second protective layer may be made smoothly, and the defective rate of the manufactured second protective layer may be reduced.

The material and thickness of the release film is not particularly limited, and various films may be used. As the release film, for example, a polyethylene terephthalate (PET) film, a polyethylene (PE) film, a polypropylene (PP) film, a silicon-based release film and the like may be used, and the thickness of the release film may be, for example, 12 μm to 80 μm.

The coating method may be solution casting, spray casting, spraying, or rolling, but is not limited thereto.

In addition, an initiator may be used together to form the cross-linked ion conductive electrolyte layer. The initiator may be at least one selected from the group consisting of azobisisobutyronitrile, benzoyl peroxide, t-butylperoxy-2-ethyl-hexanoate, cumylperoxide, t-butylperoxide, and 1,1-di(t-butylperoxy)cyclohexane.

In step (b2), the electrically conductive material may be deposited on the cross-linked ion conductive electrolyte layer to form a second protective layer comprising the electrically conductive matrix and the cross-linked ion conductive electrolyte.

In this case, when the electrically conductive material is deposited, the particles of the electrically conductive material penetrate into the inside of the cross-linked ion conductive electrolyte layer, and particles of the electrically conductive material are inserted into the cross-linked ion conductive electrolyte layer. The particles of the electrically conductive material inserted into the inside of the cross-linked ion conductive electrolyte layer may be inserted in the form of islands, and also may be connected to each other to form a skeleton of a three-dimensional structure and thus form an electrically conductive matrix, and the island shape and the three-dimensional structure may be formed together.

In other words, the cross-linked ion conductive electrolyte may be contained in the inner space of the electrically conductive matrix, or the cross-linked ion conductive electrolyte may be formed on the surface of the electrically conductive matrix to surround the electrically conductive matrix.

In step (C), a lithium electrode may be formed by transferring the second protective layer onto the first protective layer.

The lithium metal may be formed on the current collector. The current collector is not particularly limited as long as it is conductive without causing chemical changes in the battery. For example, the current collector may be at least one selected from the group consisting of copper, stainless steel, aluminum, nickel, titanium, and sintered carbon.

Lithium Secondary Battery

The present invention also relates to a lithium secondary battery comprising the lithium electrode as described above.

In the lithium secondary battery, the lithium electrode may be comprised as a negative electrode, and the lithium secondary battery may comprise an electrolyte solution provided between the negative electrode and the positive electrode.

The shape of the lithium secondary battery is not limited, and may be, for example, coin type, flat type, cylindrical type, horn type, button type, sheet type, or stacked type. In addition, the lithium secondary battery may further comprise a respective tank for storing a positive electrode electrolyte solution and a negative electrode electrolyte solution, and a pump for moving each electrolyte solution to the electrode cell, and thus may be manufactured as a flow battery.

The electrolyte solution may be an electrolyte solution impregnated into the negative electrode and the positive electrode.

The lithium secondary battery may further comprise a separator provided between the negative electrode and the positive electrode. The separator disposed between the positive electrode and the negative electrode is not particularly limited as long as it separates or isolates the positive and negative electrodes from each other, and allows the transport of ions between the positive and negative electrodes. The separator may be, for example, a non-conductive porous membrane or an insulating porous membrane. More specifically, polymer nonwovens such as nonwoven fabric of polypropylene material or nonwoven fabric of polyphenylene sulfide material; or porous films of olefin resins such as polyethylene and polypropylene may be exemplified, and it is also possible to use two or more types of these together.

The lithium secondary battery may further comprise a positive electrode electrolyte solution on the positive electrode side and a negative electrode electrolyte solution on the negative electrode side separated by a separator. The positive electrode electrolyte solution and the negative electrode electrolyte solution may comprise a solvent and an electrolytic salt, respectively. The positive electrode electrolyte solution and the negative electrode electrolyte solution may be the same or different from each other.

The electrolyte solution may be an aqueous electrolyte solution or a non-aqueous electrolyte solution. The aqueous electrolyte solution may contain water as a solvent, and the non-aqueous electrolyte solution may contain a non-aqueous solvent as a solvent.

The non-aqueous solvent may be selected from those generally used in the art and is not particularly limited, and for example, may be selected from the group consisting of a carbonate-based solvent, an ester-based solvent, an ether-based solvent, a ketone-based solvent, an organosulfur-based solvent, an organophosphorous-based solvent, an aprotic solvent, or a combination thereof.

The electrolytic salt refers to those that dissociate into a cation and an anion in water or a non-aqueous organic solvent, and is not particularly limited as long as it may deliver lithium ion in the lithium secondary battery. The electrolytic salt may be selected from those generally used in the art.

The concentration of the electrolytic salt in the electrolyte solution may be 0.1 M or more and 3 M or less. In this case, the charging/discharging characteristics of the lithium secondary battery may be effectively expressed.

The electrolyte may be a solid electrolyte membrane or a polymer electrolyte membrane.

The material of the solid electrolyte membrane and the polymer electrolyte membrane is not particularly limited, and may be those generally used in the art. For example, the solid electrolyte membrane may comprise a composite metal oxide, and the polymer electrolyte membrane may be a membrane having a conductive polymer inside the porous substrate.

The positive electrode refers to an electrode that accepts electrons and reduces lithium-containing ions when the battery is discharging in the lithium secondary battery. On the contrary, when the battery is charged, it acts as a negative electrode (oxidation electrode), and the positive electrode active material is oxidized to release electrons and lose lithium-containing ions.

The positive electrode may comprise a positive electrode current collector and a positive electrode active material layer formed on the positive electrode current collector.

In the present invention, the material of the positive electrode active material of the positive electrode active material layer is not particularly limited as long as it is applied to a lithium secondary battery together with the negative electrode to reduce lithium-containing ions during discharging and oxidize them during charging. The material of the positive electrode active material may be, for example, a composite material based on a transition metal oxide or sulfur (S), and may specifically include at least one of $LiCoO_2$, $LiNiO_2$, $LiFePO_4$, $LiMn_2O_4$, $LiNi_xCo_yMnzO_2$ (wherein x+y+z=1), $Li_2FeSiO_2$, $Li_2FePO_4F$, and $Li_2MnO_3$.

In addition, if the positive electrode is a composite material based on sulfur (S), the lithium secondary battery may be a lithium-sulfur battery. The composite material based on sulfur (S) is not particularly limited, and a positive electrode material commonly used in the art may be selected and applied.

The present specification provides a battery module comprising the lithium secondary battery as a unit cell.

The battery module may be formed by stacking on a bipolar plate provided between two or more lithium secondary batteries according to one embodiment of the present specification.

If the lithium secondary battery is a lithium air battery, the bipolar plate may be porous to supply externally supplied air to a positive electrode comprised in each of the lithium air batteries. The bipolar plate may comprise, for example, porous stainless steel or porous ceramics.

Specifically, the battery module may be used as a power source of an electric vehicle, a hybrid electric vehicle, a plug-in hybrid electric vehicle, or a power storage device.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

Example 1

(1) Formation of a First Protective Layer

A first protective layer comprising an ion conductive electrolyte layer was formed on one surface of a lithium metal having a thickness of 20 μm.

Poly(ethylene oxide) (PEO, molecular weight: 1,000,000), an ion conductive polymer, was mixed with an electrolyte solution prepared by dissolving LiFSI, a lithium salt, in an acetonitrile solvent, and then the resulting solution was coated on one surface of a silicon-based release film (SKC Hass company) by a solution casting method to form an ion conductive electrolyte layer. Thereafter, the ion conductive electrolyte layer was vacuum dried at room temperature for 24 hours to form a uniform film. Then, the uniform film was transferred onto a lithium negative electrode having a thickness of 20 μm to form a first protective layer. In this case, the solid content of the ion conductive polymer (PEO) and lithium salt (LiFSI) was set to be 20% by weight relative to the acetonitrile solvent, the weight ratio of the EO (ethylene oxide) contained in the PEO and Li contained in LiFSI was set to be 20:1 (EO:Li=20:1).

(2) Formation of a Second Protective Layer

A crosslinked ion conductive electrolyte layer was formed on one surface of a silicon-based release film (SKC Hass company).

Poly(ethylene oxide) (PEO, molecular weight: 1,000,000) as an ion conductive polymer, poly(ethylene glycol) diacrylate (PEGDA) as a cross-linking agent, and benzoyl peroxide (2% by weight) as an initiator were mixed with an electrolyte solution prepared by dissolving LiFSI as a lithium salt in an acetonitrile solvent, and then the resulting solution was coated on one surface of the release film by a solution casting method, and then vacuum-dried and heated at 80° C. for 1 hour to form a cross-linked ion conductive electrolyte layer (weight ratio, PEG:PEGDA=80:20, EO:Li=16:1).

Cu was deposited on one surface of the crosslinked ion conductive electrolyte layer. As the Cu was vacuum deposited on one surface of the ion conductive electrolyte layer, Cu particles penetrated into the ion conductive electrolyte layer, and the Cu particles are electrically connected to each other in the ion conductive electrolyte layer to form a Cu matrix in the form of a three-dimensional structure having a space therein, thereby preparing a second protective layer.

(3) Preparation of Lithium Electrode

The second protective layer was transferred onto a first protective layer to prepare a lithium electrode.

(4) Manufacture of Lithium Secondary Battery

Li/Li Symmetric Cell was prepared using the prepared lithium electrode. Since the first protective layer and the second protective layer function as separators, a separate separator was not used.

Comparative Example 1

A lithium electrode and a lithium secondary battery were manufactured in the same manner as in Example 1, except that only an ion conductive electrolyte layer (first protective layer) was formed on the lithium electrode.

Comparative Example 2

A lithium electrode and a lithium secondary battery were manufactured in the same manner as in Example 1 except that only a crosslinked ion conductive electrolyte layer (unformed Cu matrix in the second protective layer) was formed on the lithium electrode.

Comparative Example 3

A lithium electrode and a lithium secondary battery were manufactured in the same manner as in Example 1 except that the protective layer was not formed.

Experimental Example 1

In the examples and comparative examples, the lifetime characteristics of the lithium secondary battery was measured by charging/discharging at a current of 0.5 mA/cm$^2$ and a capacity of 1 mAh/cm$^2$ at 60° C.

In addition, modulus was measured at 60° C. using a dynamic viscoelasticity measuring device (DMA, PerkinElmer DMA 8000) for the protective layers of lithium electrodes in the examples and the comparative examples (E': storage modulus, E": loss modulus, tan δ(E"/E').

Table 1 describes the measurement results of the lifetime characteristics and modulus.

TABLE 1

| | Ion conductivity of first protective layer (S/cm) | Ion conductivity of second protective layer (S/cm) | E' (Mpa, 60° C.) | E" (Mpa, 60° C.) | δ (°, 60° C.) | Short occurrence time (cycle) |
|---|---|---|---|---|---|---|
| Example 1 | $3 \times 10^{-4}$ | $3 \times 10^{-5}$ | 55.5 | 7.0 | 7.4 | 28 |
| Comparative Example 1 | $3 \times 10^{-4}$ | — | Not measurable | Not measurable | Not measurable | 13 |
| Comparative Example 2 | — | $3 \times 10^{-5}$ | 55.0 | 7.0 | 7.4 | 17 |
| Comparative Example 3 | — | — | — | — | — | 0 (short at the time of assembling) |

As shown in Table 1, it can be seen that the lithium electrode of Example 1 has the best lifetime characteristics.

Also, in the case of the ion conductive electrolyte layer as in Comparative Example 1, the modulus was not measured. In the case of the crosslinked ion conductive electrolyte layer as in Comparative Example 2, the modulus was relatively excellent. In the case of Example 1, the modulus was the best due to the formation of the first protective layer in which the ion conductive electrolyte layer was formed and the second protective layer in which the ion conductive electrolyte layer was crosslinked with the electrically conductive matrix.

As described above, although the present invention has been described by way of limited examples and drawings, but the present invention is not limited thereto, and various modifications and variations are possible by those of ordinary skill in the art within the scope of the technical spirit of the present invention and the equivalent scope of the claims to be described below.

The invention claimed is:

1. A lithium electrode comprising:
a lithium metal layer; and
a protective layer formed on at least one surface of the lithium metal layer,
wherein the protective layer comprises a first protective layer formed on the at least one surface of the lithium metal layer; and a second protective layer formed on the first protective layer opposite to the lithium metal layer,
the first protective layer comprises an ion conductive electrolyte, and
the second protective layer comprises an electrically conductive matrix and a crosslinked ion conductive electrolyte,
wherein the first protective layer has an ion conductivity that is greater than an ion conductivity of the second protective layer, the ion conductivity of the first protective layer ranges from $1 \times 10^{-5}$ S/cm to $1 \times 10^{-2}$/cm, and the ion conductivity of the second protective layer ranges from $1 \times 10^{-6}$ S/cm to $1 \times 10^{-2}$ S/cm,
wherein the second protective layer comprises the crosslinked ion conductive electrolyte in an interior and on a surface of the electrically conductive matrix,
wherein the electrically conductive matrix is at least one electrically-conductive material selected from the group consisting of an electrically conductive metal, a semiconductor, and an electrically conductive polymer, and
wherein when the electrically conductive metal is present in the electrically conductive matrix, the electrically conductive metal is at least one selected from the group consisting of copper, gold, silver, aluminum, nickel, zinc, carbon, tin, and indium,
when the semiconductor is present in the electrically conductive matrix, the semiconductor is at least one selected from the group consisting of silicon and germanium, and
when the electrically conductive polymer is present in the electrically conductive matrix, the electrically conductive polymer is at least one selected from the group consisting of poly(3,4-ethylenedioxythiophene) (PEDOT), polyaniline, polypyrrole, polythiophene, polyacetylene, polyphenylene, and poly(thienylene vinylene).

2. The lithium electrode according to claim 1, wherein the ion conductive electrolyte of the first protective layer comprises a first ion conductive polymer and a first lithium salt, and the crosslinked ion conductive electrolyte of the second protective layer comprises a second ion conductive polymer, a cross-linking agent, and a second lithium salt.

3. The lithium electrode according to claim 2, wherein the first ion conductive polymer and second ion conductive polymer are each at least one selected from the group consisting of poly(ethylene oxide) (PEO), poly(polypropylene oxide) (PPO), poly(acrylonitrile) (PAN), and poly(vinylidene fluoride) (PVDF).

4. The lithium electrode according to claim 2, wherein the cross-linking agent is at least one selected from the group consisting of poly(ethylene glycol) diacrylate (PEGDA), poly(ethylene glycol) dimethacrylate (PEGDMA), poly(propylene glycol) diacrylate (PPGDA), and poly(propylene glycol) dimethacrylate (PPGDMA).

5. The lithium electrode according to claim 2, wherein the first lithium salt and second lithium salt are each at least one selected from the group consisting of LiCl, LiBr, LiI, LiNO$_3$, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, lithium chloroborane, lithium lower aliphatic carboxylate, lithium tetraphenyl borate, and lithium imide.

6. A lithium secondary battery comprising the lithium electrode of claim 1.

7. The lithium electrode according to claim 2, wherein in the second protective layer, a weight ratio of the second ion conductive polymer present in the electrically conductive matrix and the crosslinked ion conductive electrolyte ranges from 3:7 to 7:3.

* * * * *